United States Patent
Studinka et al.

[15] 3,706,702
[45] Dec. 19, 1972

[54] LINEAR AROMATIC COPOLYTHIOETHERS

[72] Inventors: Josef Studinka, Zurich; Rudolf Gabler, Uitikon-Waldegg/Zurich, both of Switzerland

[73] Assignee: General Electric Company

[22] Filed: March 2, 1970

[21] Appl. No.: 15,939

[30] Foreign Application Priority Data

March 3, 1969 Switzerland..........................3197/69

[52] U.S. Cl.........260/47 R, 260/30.4 R, 260/30.6 R, 260/30.8 R, 260/32.4, 260/32.6 R, 260/33.8 R, 260/37 R, 260/61, 260/63 R, 260/63 HA, 260/79
[51] Int. Cl..........................C08g 23/00, C08g 23/24
[58] Field of Search........260/47 R, 63 R, 63 HA, 61, 260/79

[56] References Cited

UNITED STATES PATENTS 3,547,887  12/1970  Gabler et al............................260/47
3,432,468  3/1969  Gabler et al............................260/47
3,532,670  10/1970  Schnell et al..........................260/49

*Primary Examiner*—William H. Short
*Assistant Examiner*—L. L. Lee
*Attorney*—Mason, Fenwick and Lawrence

[57]  ABSTRACT

Heat resistant linear aromatic copolythioethers having recurring the structural units —S—R—S—R′ in which R and R′ originate from a dithiol and a polyhalogen. Preparing these copolythioethers by intermixing an aromatic dithiol and a bifunctional aromatic polyhalogen and an aromatic dithiol or a bifunctional aromatic polyhalogen different from the above. Reacting these compounds in an alkaline medium, without oxygen and in the presence of an inert polar aprotic solvent. Then recovering the copolythioether.

1 Claim, No Drawings

LINEAR AROMATIC COPOLYTHIOETHERS

The present invention relates to heat-resistant, linear aromatic copolythioethers and to a process for the preparation thereof.

In French Pat. Specification No. 1,576,583 there corresponding to U.S. Pat. No. 3,432,468 are described thermoplastic, aromatic polythioethers having good mechanical and thermal properties. These are prepared by polycondensation of an aromatic dithiol with an aromatic dihalogen compound in a suitable solvent and in the presence of an acid acceptor. Aromatic polythioethers of this kind are insoluble or soluble to a limited extent in low-boiling organic solvents. It is true that in many cases these polythioethers can be dissolved in low-boiling solvents such as, for example, chloroform in concentrations up to 20–30 percent, but these solutions have a tendency to precipitate solid polymer particles and become markedly cloudy already during preparation or after a few hours. Films and coatings cast from solutions which are unstable to such an extent are opaque, have a rough surface and exhibit impaired mechanical and electrical properties.

Since highly viscous, stable, clear solutions in low-boiling organic solvents, in particular methylene chloride, are required for many purposes, for example, for working up into insulating films or wire lacquers and for impregnating purposes, it is desirable to produce aromatic polythioethers which have improved dissolving properties.

Surprisingly, it has now been found that it is possible to produce heat-resistant, linear aromatic copolythioethers from which highly viscous, clear solutions which are stable over a period of several days to weeks can be prepared, by reacting aromatic dithiol with bifunctional aromatic polyhalogen compound at elevated temperature and in the presence of alkalies and in the absence of oxygen in a polar aprotic solvent which is inert in relation to the starting materials and in which the copolythioether formed is soluble, on condition that there is employed a mixture of at least two dithiols and/or a mixture of at least two polyhalogen compounds.

As dithiol there is employed with advantage a dithiol of formula I

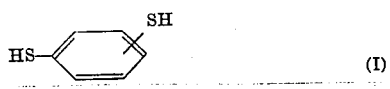
(I)

in which the two sulphydryl groups are separated by a chain of at least three carbon atoms, or a dithiol of the formula II

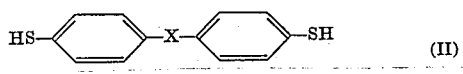
(II)

in which X signifies the direct bond or a bivalent bridge member from the group —$CH_2$—, —$C(CH_3)_2$—, —O—, —S—, —$SO_2$—, —CO—, —COCO— or —CONH—.

Examples of suitable dithiol compounds of formula I are:
1,3- or 1,4-disulphydrylbenzene;
suitable dithiol compounds of formula II are, for example:

4,4'-disulphydryldiphenyl,
4,4'-disulphydryldiphenylmethane,
2,2-bis-(4,4'-disulphydryldiphenyl)-propane
4,4'-disulphydryldiphenyl ether
4,4'-disulphydryldiphenyl sulphide
4,4'-disulphydryldiphenyl sulphone
and also disulphydrylnaphthalene of the formula

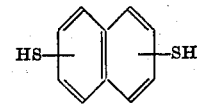

As polyhalogen compounds there are preferably employed polyhalogen compounds of formula III

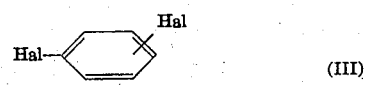
(III)

in which "Hal" signifies chlorine, bromine or iodine and the two halogen atoms are separated by a chain of at least three carbon atoms, or polyhalogen compounds of formula IV or V

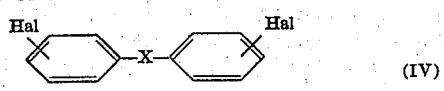
(IV)

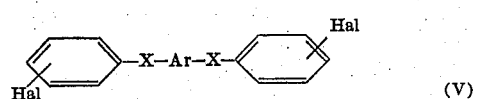
(V)

in which X and "Hal" signify what has been indicated in connection with formulas II and III, respectively, and Ar signifies an aromatic radical such as, for example,

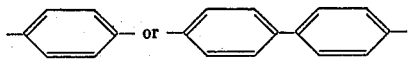

It is advantageous, but not a condition, to employ those dihalogen compounds of formula IV or V in which the two halogens atoms are in 4,4'-position and are activated by electron-attracting bridge members.

Examples of such activating substituents are the sulphonyl, disulphonyl, keto, diketo, carbonamide, alkylphosphinoxide and perfluorethyl groups. However, a plurality of halogen atoms may also so activate one another mutually that two thereof become movable. This is the case, for example, in hexachlorobenzene, in which two chlorine atoms in p-position are movable with respect to one another. Preferred electron-attracting substituents are the sulphonyl and keto groups.

Examples of polyhalogen compounds of the formula III are:
1,4-dichlorobenzene
1,4-dibromobenzene
1,3-dichlorobenzene
hexachlorobenzene
pentachlorobromobenzene.

Examples of polyhalogen compounds of formula IV are:
4,4'-dichlorodiphenylsulphone
4,4'-dibromodiphenylsulphone
4,4'-dichlorodiphenyldisulphone
4,4'-dibromobenzophenone
4,4'-dichlorobenzile
4,4'-dichlorodiphenyl-P-ethylphosphinoxide
3,4,3',4'-tetrachlorodiphenylsulphone.

Examples of polyhalogen compounds of formula V are:

4,4'-bis-(4-chlorophenylsulphonyl)-diphenyl
4,4'-bis-(4-chlorophenylsulphonyl)-diphenyl ether
4,4'-dichloroterephthalophenone
4,4'-dichloro-isophthalophenone
N,N'-bis-(4-chlorobenzoyl)-m-phenylenediamine
N,N'-bis-(4-chlorobenzoyl)-p-phenylenediamine.

As bases in the presence of which the process according to the invention is desirably carried out, there may be used ammonia, alkali metal hydroxides (in particular sodium or potassium hydroxide), or alkaline-earth e.g. Ca, Ba, Sr, Mg) hydroxides, oxides or carbonates. Generally, an amount of alkali of approximately 1–1.5 equivalent per halogen and preferably 1.0 may be used.

It is naturally also possible to convert the dithiols first of all into their salts with said alkalines and cause them to react as such with the polyhalogen compound.

The following may be used as polar, aprotic solvents which are inert in relation to the starting materials and in which the copolythioether formed is dissolved: Dimethylformamide, dimethylacetamide, dimethyl sulphoxide, tetrahydrothiophene-S-dioxide ("Sulfolan"), N-methylpyrrolidone, phosphoric acid-tris(N,N-dimethylamide), and tetramethyl-urea. Mixtures of these solvents may also be employed. The amount of these solvents that may be used ranges from 5–30 percent by weight (preferably 10–20 percent) of the solution of the resulting polymers or of the total of the starting materials. It is advantageous if the starting materials, i.e. the alkali metal salts of the dithiols, as well as the polyhalogen compounds, are also at least partly soluble in the solvents employed. With the strongly polar solvents it is furthermore possible to admix the diluents such as, for example, chlorobenzene or nitrobenzene, the dissolving capacity of which would not be sufficient by itself alone for carrying out the poly-condensation in the desired manner.

The reaction temperatures depend on the reactivity of the starting materials and on the stability of the solvents and are generally between 50° and 250° C. It is advantageous to operate at 100°–140° C, since all the solvents mentioned are sufficiently stable in this temperature range and most of the starting materials show sufficient readiness to react. Only in special cases is it necessary to operate in N-methylpyrrolidone at 200°–210° C.

According to the invention, mixtures either of the dithiol constituent or of the polyhalogen constituent or of both constituents are employed. Advantageously, mixtures only of the polyhalogen constituents, and in fact mixtures of two such polyhalogen compounds, are employed. The reciprocal mixing ratio is advantageously between 9:1 and 1:9, in particular around 1:1 (molar ratio). The components of the mixture may be put through the reaction in succession or together. In the first case, for example, one component of the mixture may first be caused to react and, after it has been completely converted, the other may be caused to react. In this case, alternating copolymers are preferably obtained, while with simultaneous reaction of both mixture components and suitable choice of the polyhalogens statistical copolymers may also be formed. The molar ratio between the aromatic dithiols and the polyhalogens is advantageously around 1:1.

The process according to the invention may also be rendered continuous. The copolythioethers according to the invention consist of recurring structural units of formula VI $$-S-R-S-R'- \qquad (VI)$$

in which R and R' each signify a bivalent aromatic radical originating from the aforementioned dithiol and polyhalogen compounds, provided that the recurring R and/or R' are different.

As exact molecular weights cannot be given for the time being for the copolythioethers according to the invention, the reduced specific viscosity (RSV), which is represented by the equation $$RSV = (\eta \text{ rel} - 1)/C,$$

is used to designate the average chain length. In this equation, "$\eta$ rel" signifies the relative viscosity and C the concentration of the copolythioether in grams per 100 ml of solvent. Chloroform or N-methylpyrrolidone is employed as solvent.

It has been found that RSV values of at least 0.3 must be aimed at in the copolythioethers according to the invention in order to achieve favorable results in thermoplastic working up. Values of 0.3–0.8 are preferable. For working up from solution, copolythioethers with RSV values >0.8 are also suitable.

In order to adjust the molecular weight or the RSV to a desired low value, operation is preferably carried out with a small excess of 0.1–1 mol percent of the polydihalogen. In order to limit the molecular weight, it is also possible, however, to employ 0.1–1 mol % of a chain-breaking compound such as, for example, 4-chlorodiphenylsulphone, benzyl chloride, benzyl bromide, ethyl bromide, etc. Generally, the readiness to react of the starting materials employed is great enough, so that the use of special catalysts can be dispensed with. If it is desired to shorten the reaction time, which may be desirable, for example, in the continuous performance of the polycondensation, salts of copper or iodine such as, for instance, copper (I) chloride, copper (II) chloride, copper acetate, copper iodide, potassium iodide or sodium iodide may be added as reaction accelerators.

In order to lighten the generally somewhat yellowish-colored copolythioethers, color-improving additions, such as, for example, sodium phosphite, phosphorous acid, triphenyl phosphite or suitable optical brighteners may be added before, during, or after the polycondensation.

Finally, colored copolythioethers can be produced by adding pigments or soluble or dispersible dyes to the reaction mixtures.

The copolythioethers according to the invention can be formed from a melt or a solution into numerous articles such as, for instance, films, sheets, tubes, rods, sections and injection molded articles of all kinds. Due to their good solubility in low-boiling organic solvents, such as methylene chloride, chloroform, tetrachloroethane, the copolythioethers according to the invention are particularly well suited for fields in which highly concentrated solutions (solids content about 20–30 percent) in these solvents are required. Such articles are distinguished in particular by their great heat resistance, which is characterized by continuous-use temperatures of 150°–200° C. Furthermore, they possess excellent electrical insulating properties, low water absorption, great stability of shape and strength under heat and chemical resistance to dilute acids, alkalies of all concentrations and the majority of organic solvents, with the exception of chlorinated hydrocarbons.

In addition to their above-mentioned good solubility, the copolythioethers according to the invention have the advantage of low combustibility. Moreover, in the process according to the invention it is possible to adapt the melting or softening range and the stability of shape under heat of the copolythioethers to be produced to the desired optimum data for a particular working-up process.

The other properties of the copolymers, for example mechanical strength, electrical insulating properties and resistance to continuous heat, are not affected detrimentally by such action.

The following Examples will serve to illustrate the invention more fully.

EXAMPLE 1

11.717g (0.05 mol) of 4,4'-disulphydryldiphenyl ether, 6.995g (0.066 mol) of anhydrous sodium carbonate, 7.179g (0.025 mol) of 4,4'-dichlorodiphenylsulphone, and 12.586g (0.025 mol) of 4,4'-bis-(4-chlorophenylsulphonyl)-biphenyl are weighed out and put into a 250 ml three-necked flask equipped with a stirrer, a gas inlet tube and a reflux condenser and 50 ml of N,N-dimethylformamide are added. The mixture is heated to 150° C while passing nitrogen therethrough. The viscosity of the solution, which is initially orange-red, increases considerably after a few minutes and at the same time the color changes to yellowish-white to white. After a reaction time of two hours, the viscous condensate is precipitated in water, crushed and the inorganic salts are removed by repeated boiling-out with water. The white, granular product is then dried in a high vacuum at 140° C.

The reduced specific viscosity of the polymer is 0.82 (measured in chloroform, 0.2g/100 ml of solvent). The product is readily soluble in methylene chloride and clear films of high mechanical strength can be produced from such solutions. The strikingly good solubility of the product in methylene chloride is surprising when it is considered that the corresponding homopolymers (which can be prepared from 4,4'-disulphydryldiphenyl ether and 4,4'-dichlorodiphenylsulphone and 4,4'-disulphydryldiphenyl ether and 4,4'-bis-(4-chlorophenylsulphonyl)-biphenyl, respectively) are at the most soakable, but not soluble, in this solvent.

The polymer can be worked thermoplastically at temperatures of 280° to 350° C. Clear, colorless films extruded at 300° C show the following properties:

|  | 20° | 100° | 150° | 180° |
|---|---|---|---|---|
| Tensile strength (yield point) kg/cm² | 760 | 490 | 380 300 |  |
| Elongation (yield point) % | 6 | 3 | 2 | 2 |
| Tensile strength (break) kg/cm² | 670 | 410 | 340 210 |  |
| Elongation at break % | 12 | 25 | 68 | 82 |

The glass transition point Tg is 209° C (determined by differential thermoanalysis).

The polymer described has excellent resistance to prolonged heat. Strips of film show no decline of mechanical properties after heat-ageing for 6 months at 200° C in air.

EXAMPLE 2

23.434g (0.1 mol) of 4,4'-disulphydryldiphenyl ether, 7.179g (0.025 mol) of 4,4'-dichlorodiphenylsulphone and 37.758g (0.075 mol) of 4,4'-bis-(4-chlorophenylsulphonyl)-biphenyl are dissolved in 100 ml of N,N-dimethylformamide in a 250 ml glass autoclave equipped with a stirrer and a gas inlet tube. After thorough flushing with nitrogen, the autoclave is filled with ammonia and the pressure is kept constant at 4 atmospheres. The condensation mixture is now heated to 150° C. The clear solution becomes yellow, the viscosity increases and the ammonium chloride formed is gradually precipitated. The polycondensation is complete after two hours. The working up is effected in the manner indicated in Example 1.

The reduced specific viscosity of the colorless polymer obtained is 0.41 (measured in chloroform, 0.2g/100 ml of solvent).

Clear films of high mechanical strength can be obtained from solutions in methylene chloride or chloroform. The glass transition temperature of the polymer, which is determined by differential thermoanalysis, is 219° C and the softening range is 260°–270° C. Clear flexible films or moldings can be extruded at 300° C.

EXAMPLE 3

11.717g (0.05 mol) of 4,4'-disulphydryldiphenyl ether are dissolved in 70 ml of xylene in a 250 ml three-necked flask equipped with a stirrer, a Dean-Stark attachment and a gas inlet tube and 11.05 ml of aqueous caustic soda (362 mg NaOH/ml, 0.1 mol) are added thereto. The mixture is heated to boiling while passing in nitrogen. The water distills off as azeotrope with the xylene and is separated quantitatively in two hours. After the xylene has been distilled off, the disodium salt of 4,4'-disulphydryldiphenyl ether is obtained as a white crystalline powder. 7.179g (0.025 mol) of 4,4'-dichlorodiphenylsulphone and 7.120g (0.025 mol) of hexachlorobenzene are added and the mixture is dissolved in 50 ml of dimethyl sulphoxide. In order to slow down the exothermic reaction which begins, the reaction mixture is cooled in a water bath. After 30 minutes have elapsed, the temperature is increased to 150° C, and after another two hours the polycondensation is complete. The product is worked up as indicated in Example 1. The reduced specific viscosity is 0.51 (measured in N-methylpyrrolidone, 0.2g/100 ml of solvent). Slightly yellow-colored sheets can be obtained by extrusion at 280° C from the fine-grained granular material, these sheets being distinguished by a markedly reduced combustibility.

EXAMPLE 4

The corresponding disodium slat is prepared from 11.717g (0.05 mol) of 4,4'-disulphydryldiphenyl ether by the method given in Example 3. After the xylene has been distilled off, 13.320g (0.0375 mol) of 4,4'- dichloroiso-phthalophenone and 4.441g (0.0125 mol) of 4,4'-dichloro-terephthalophenone are weighed in and 60 ml of N-methylpyrrolidone are added. The polycondensation is carried out at 180° C and is complete after three hours. The product, which is precipitated in water and freed from the sodium chloride in conventional manner and dried, is slightly yellowish in color. The reduced specific viscosity is 0.70 (measured in N-methylpyrrolidone, 0.2g/100 ml of solvent). In contrast to the corresponding crystalline homopolymers, the copolymer is completely amorphous and has a glass transition point of 142° C. Clear films of high flexibility and mechanical strength can be extruded at 250° C. The resistance of the polymer to prolonged heat is excellent; after heat-ageing for 15 months at 160° C, the test strips show no change in mechanical and optical respects. Whereas the homopolymers of the corresponding structure are soluble only in hot N-methylpyrrolidone (boiling point 202° C), the copolymer obtained is soluble both in chloroform and in methylene chloride. Thin, clear films can be cast from the solutions.

EXAMPLE 5

11.717g (0.05 mol) of 4,4'-disulphydryldiphenyl ether are converted into the disodium salt in the apparatus described in Example 3. 9.631g (0.025 mol) of N,N'-bis-(4-chlorobenzoyl)-m-phenylenediamine and 9.631g (0.025 mol) of N,N'-bis-(4-chlorobenzoyl)-p-phenylenediamine are added and the mixture is dissolved in 50 ml of N,N'-dimethyl-acetamide. The polycondensation is carried out at 170° C in 10 hours. The highly viscous solution is isolated by the conventional method by precipitation in water and is worked up. The granular white product is soluble in dimethyl sulphoxide and N-methylpyrrolidone. The reduced specific viscosity is 0.49 (measured in N-methylpyrrolidone, 0.2g/100 ml of solvent). From said solvents, the polymer can be spun into filaments or cast in films which do not soften up to 350° C.

EXAMPLE 6

A similar procedure to that described in Example 3 is followed, with the difference that the disodium salt of 4,4'-disulphydryldiphenyl ether is reacted with 7.179g (0.025 mol) of 4,4'-dichlorodiphenylsulphone and 8.881g (0.025 mol) of 4,4'-dichloroterephthalophenone. 80 ml of N-methylpyrrolidone is used as solvent. The polycondensation is carried out in two hours at 200° C. After working up, the product is obtained in fine-grained slightly yellow-colored form. The reduced specific viscosity is 0.50 (measured in N-methylpyrrolidone, 0.2g/100 ml of solvent). The amorphous polymer has a glass transition temperature of 162° C and is readily soluble in tetrachloro-ethane and in dimethyl sulphoxide. Moldings can be produced therefrom at 220°-250° C by pressing, injection molding or extrusion. Parts made from the polymer have good mechanical and electrical properties.

EXAMPLE 7

The apparatus described in Example 3 is employed. 11.717g (0.05 mol) of 4,4'-disulphydryldiphenyl ether and 7.111g of (0.05 mol) of 1,3-disulphydrylbenzene are converted with 22.1 ml of aqueous caustic soda (362 mg NaOH/ml, 0.2 mol) into a mixture of the corresponding sodium salts. The removal of the water is effected in conventional manner by azeotropic distillation with xylene.

The salt mixture present in solid form is dissolved in 100 ml of N,N-dimethylformamide and then polycondensed in two hours at 140° C with 50.343g (0.1 mol) of 4,4'-bis-(4-chlorophenylsulphonyl)-biphenyl. The working-up of the viscous condensation mixture is effected in conventional manner.

The colorless, granular copolymer can be extruded at 280° C in the form of clear flexible films which are distinguished by good stability of shape and high mechanical strength.

The copolyarylthioether is readily soluble in chloroform and can be cast in clear films from 20 to 30% solutions.

We claim:

1. Heat-resistant linear aromatic copolythioethers characterized as having film forming properties, consisting of recurring structural units having the formula $$-S-R-S-R'-$$

in which R and R' each signify a bivalent aromatic radical, the recurring R and/or R' being different, wherein R is selected from the group consisting of

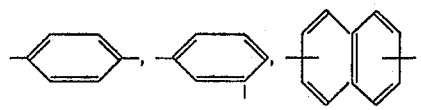

and

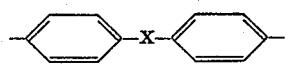

wherein X signifies the direct bond or a bivalent bridge member from the group $-CH_2-$, $-C(CH_3)_2-$, $-O-$, $-S-$, $-SO_2-$, $-CO-$, $-COCO-$ or $-CONH$, and R' is selected from the group consisting of

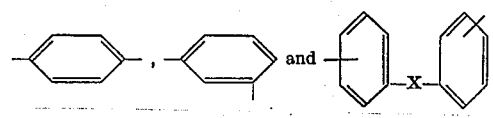

wherein X signifies the direct bond or a bivalent bridge member selected from the group consisting of $-CH_2-$, $-C(CH_3)_2-$, $-O-$, $-SO_2-$, $-CO-$, $-COCO-$, $-CONH-$, and

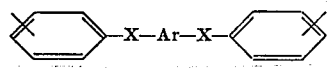

wherein X signifies the direct bond or a bivalent bridge member selected from the group consisting of $-CH_2-$, $-C(CH_3)_2-$, $-O-$, $-S-$, $-SO_2-$, $-CO-$, $-COCO-$ and $-CONH-$, and Ar is an aromatic radical selected from the group consisting of

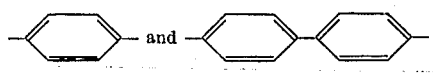

* * * * *